United States Patent [19]
Fujimori

[11] Patent Number: 5,154,077
[45] Date of Patent: Oct. 13, 1992

[54] CHASSIS DYNAMOMETER

[75] Inventor: Sadao Fujimori, Tokyo, Japan

[73] Assignee: Kabushiki Kaisha Meidensha, Tokyo, Japan

[21] Appl. No.: 583,854

[22] Filed: Sep. 17, 1990

[30] Foreign Application Priority Data

Sep. 18, 1989 [JP] Japan ................. 1-241209
Jan. 29, 1990 [JP] Japan ................. 2-7178[U]
May 30, 1990 [JP] Japan ................. 2-56967[U]

[51] Int. Cl.⁵ .......................... G01M 15/00
[52] U.S. Cl. .................................. 73/117
[58] Field of Search ........... 73/117, 123, 125, 862.08

[56] References Cited
U.S. PATENT DOCUMENTS 3,577,777  5/1971  Whelan et al. ............ 73/125
3,837,219  9/1974  Clayton ..................... 73/117
4,688,419  8/1987  D'Angelo et al. ......... 73/117

Primary Examiner—Robert Raevis
Attorney, Agent, or Firm—Bachman & LaPointe

[57] ABSTRACT

A chassis dynamometer includes a load roller and a free roller both of which are driven by a tested object, such as, an automotive vehicle. The load roller is drivingly connected to a dynamometer and mounted onto a first rotary shaft for co-rotation therewith. The free roller is mounted on a second shaft such that the free roller is rotatable relative to the second shaft. A flywheel is mounted on the second shaft co-rotatably therewith for forming a simulated inertial load. A power transmission unit, such as, a combination of timing pulleys and a timing belt is provided for transmitting a driving power from the first shaft to the second shaft such that the second shaft is rotated fster than the first shaft. Since the second shaft i.e. the flywheel is rotated faster than the first shaft, i.e. the load and free rollers, an inertial load created by rotation of the flywheel is increased so that a weight of the flywheel can be reduced.

15 Claims, 6 Drawing Sheets

CHASSIS DYNAMOMETER

BACKGROUND OF THE INVENTION

1. Field of the Invention

The present invention relates generally to a chassis dynamometer for testing performance of a tested object. More specifically, the present invention relates to a twin roller type chassis dynamometer having a load roller drivingly connected to a dynamometer and a free roller, wherein a flywheel serving as an inertial load for a tested object is rotated faster than the load and free rollers.

2. Description of the Background Art

Chassis dynamometers have been used for testing performance of, for example, automotive vehicles including output and fuel consumption characteristics by simulating an actual road test, for example, by simulating running resistance, up-and down-hill road, vehicular load and the like. Accordingly, in order to obtain a precise result of the test, various conditions for the test should be set or controlled properly.

One of the conditions to be properly controlled is a simulation of an inertial load caused by a vehicle weight. In order to simulate the vehicular inertial mass, a flywheel is used which is connected to a roller of the chassis dynamometer.

In one type using the flywheel as the vehicular inertial mass, a tested vehicular wheel is placed on a roller to be driven by the vehicular wheel. The roller is drivingly connected to the dynamometer for measuring the performance of the vehicle. The roller is further connected to the flywheel for co-rotation therewith so as to provide the simulated vehicular inertial load. The flywheel is typically provided outside the roller.

On the other hand, another type, i.e. a twin roller type chassis dynamometer has been proposed in which a pair of rollers are used. Specifically, one roller (hereinafter referred to as "load roller") is drivingly connected to the dynamometer and the other roller (hereinafter referred to as "free roller") is connected to the flywheel for co-rotation therewith. The tested vehicular wheel is placed between the load and free rollers so that the flywheel applies the simulated vehicular inertial load to the tested vehicular wheel. The flywheel is typically provided in the free roller.

In the foregoing twin roller type chassis dynamometer, however, since the flywheel and the free roller-co-rotate, i.e. rotate at a rotation ratio of 1:1, in order to increase the flywheel inertial load, increment of a diameter of the flywheel and/or increment of a weight of the flywheel is inevitably required. This raises a problem particularly when the flywheel is provided in the free roller. Specifically, when the flywheel of a larger diameter is used, difficulty is encountered due to limited space for mounting the flywheel in the free roller. On the other hand, when the flywheel of a larger weight is used, difficulty is encountered since reinforcement for the free roller becomes essential for avoiding possibility of distortion, vibration and creation of noise.

SUMMARY OF THE INVENTION

Therefore, it is an object of the present invention to provide a twin roller type chassis dynamometer that can eliminate the above-noted defects or drawbacks inherent in the background art.

To accomplish the above-noted and other objects, according to one aspect of the present invention, a chassis dynamometer comprises:

a first roller mounted on first shaft means for co-rotation therewith, the first roller drivingly connected to a dynamometer and being driven by a tested object;

a second roller mounted on second shaft means, the second roller being rotatable relative to the second shaft means and being driven by the tested object, the first and second shaft means arranged in parallel to each other;

first flywheel means, mounted on the second shaft means co-rotatably therewith, for forming a simulated inertial load;

power transmission means, associated with the first and second shaft means, for transmitting a driving power from the first shaft means to the second shaft means such that the second shaft means is rotated faster than the first shaft means.

BRIEF DESCRIPTION OF THE DRAWINGS

The present invention will be understood more fully from the detailed description given hereinbelow and from the accompanying drawings of the preferred embodiments of the invention, which are given by way of example only, and are not intended to be limitative of the present invention.

In the drawings.

DESCRIPTION OF THE PREFERRED EMBODIMENT

Figure 1:
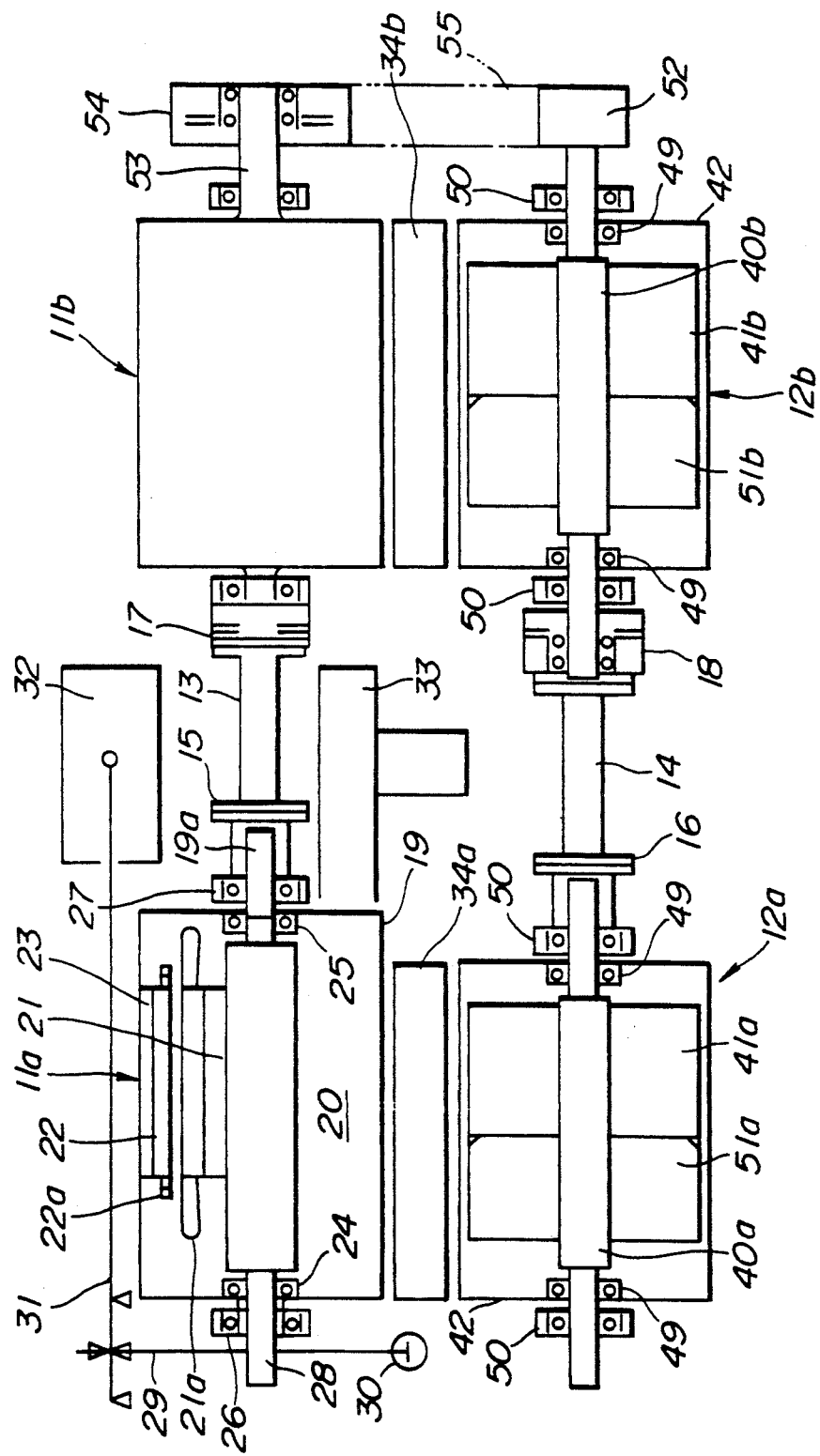
FIG. 1 is a schematic and diagrammatic plan view showing a twin roller type chassis dynamometer according to a first preferred embodiment of the present inveniton.

Now, a chassis dynamometer according to preferred embodiments of the present invention will be described hereinbelow with reference to FIGS. 1 to 6. FIG. 1 shows a twin roller type chassis dynamometer according to a first preferred embodiment of the present invention. In FIG. 1, the twin roller type chassis dynamometer has a pair of rollers 11a and 11b and a pair of rollers 12a and 12b. The rollers 11a and 11b will be hereinafter respectively referred to as "load roller" and the rollers 12a and 12b will be hereinafter respectively referred to as "free roller". The load rollers 11a and 11b are arranged in spaced apart relationship from each other in such a fashion that the load rollers 11a and 11b are placed at a transverse orientation with respect to a direction of a driving wheel of an automotive vehicle to be tested. As can be seen from FIG. 1, the load rollers 11a and 11b are connected to each other via a rotary shaft 13 through a coupling 15 and a brake 17 in such a fashion that the rotary shaft 13 co-rotates with the load rollers 11a and 11b. The rotary shaft 13 extends essentially in parallel to a drive shaft of the vehicle. The free rollers 12a and 12b are also arranged at a transverse orientation with respect to the direction of the vehicular driving wheel, i.e. in parallel relationship to the load rollers 11a and 11b. Contrary to the load rollers 11a and 11b, the free rollers 12a and 12b are connected to each other via a rotary shaft 14 through a coupling 16 and an electromagnetic clutch 18 in such a fashion that the rotary shaft 14 is rotatable relative to the free rollers 12a and 12b even when the clutch 18 is engaged. Respective driving wheels, i.e. right and left driving wheels, of the vehicle are placed between the load roller 11a and the free roller 12a and between the load roller 11b and the free roller 12b.

The load roller 11a includes a roller body 19 and a roller dynamometer 20 which is housed within the roller body 19. The roller dynamometer 20 includes a metallic stator core 21 and a metallic core 22 surrounding the stator core 21. A stator coil 21a is wound onto the stator core 21 and a rotor coil 22a is wound onto the rotor core 22. The rotor core 22 is fixedly mounted onto the inner periphery of the roller body 19 by means of one or more mounting brackets 23. On the other hand, the stator core 21 is rotatably supported by means of swingable bearings 24 and 25 which are disposed within the roller body 19. Rotary bearings 26 and 27 are provided outside the roller body 19 for rotatingly support the roller body 19. Specifically, the rotary bearing 27 is disposed between a rotary shaft 19a co-rotatable with the roller body 19 and a stationary side of the chassis dynamometer, while, the bearing 26 is disposed between the roller body 19 and the stationary side of the chassis dynamometer without contacting a swingable shaft 28. The swingable shaft 28 is extended over the roller body 19 and coupled with a swing arm 29. The swing arm 29 is connected to a load cell 30 at one end thereof. The other end of the swing arm 29 is coupled with a weight mass 32 via lever mechanism 31.

Intermediate lifts 34a and 34b are provided in spaces respectively defined between the load rollers and the free rollers 11a and 12a, and 11b and 12b. The intermediate lifts 34a and 34b are designed to be operated between an extended upper position where each of the intermediate lifts 34a and 34b is shifted up from a testing position for enabling the corresponding vehicular driving wheel to be moved away from the space between the load roller 11a of 11b and the free roller 12a or 12b, and a retracted lower position where each of the intermediate lifts 34a and 34b is shifted down from the testing position for setting the corresponding vehicular driving wheel at the testing position. A cooling unit 33 including a cooling fan is provided for generating cooling air flow.

Figure 2:
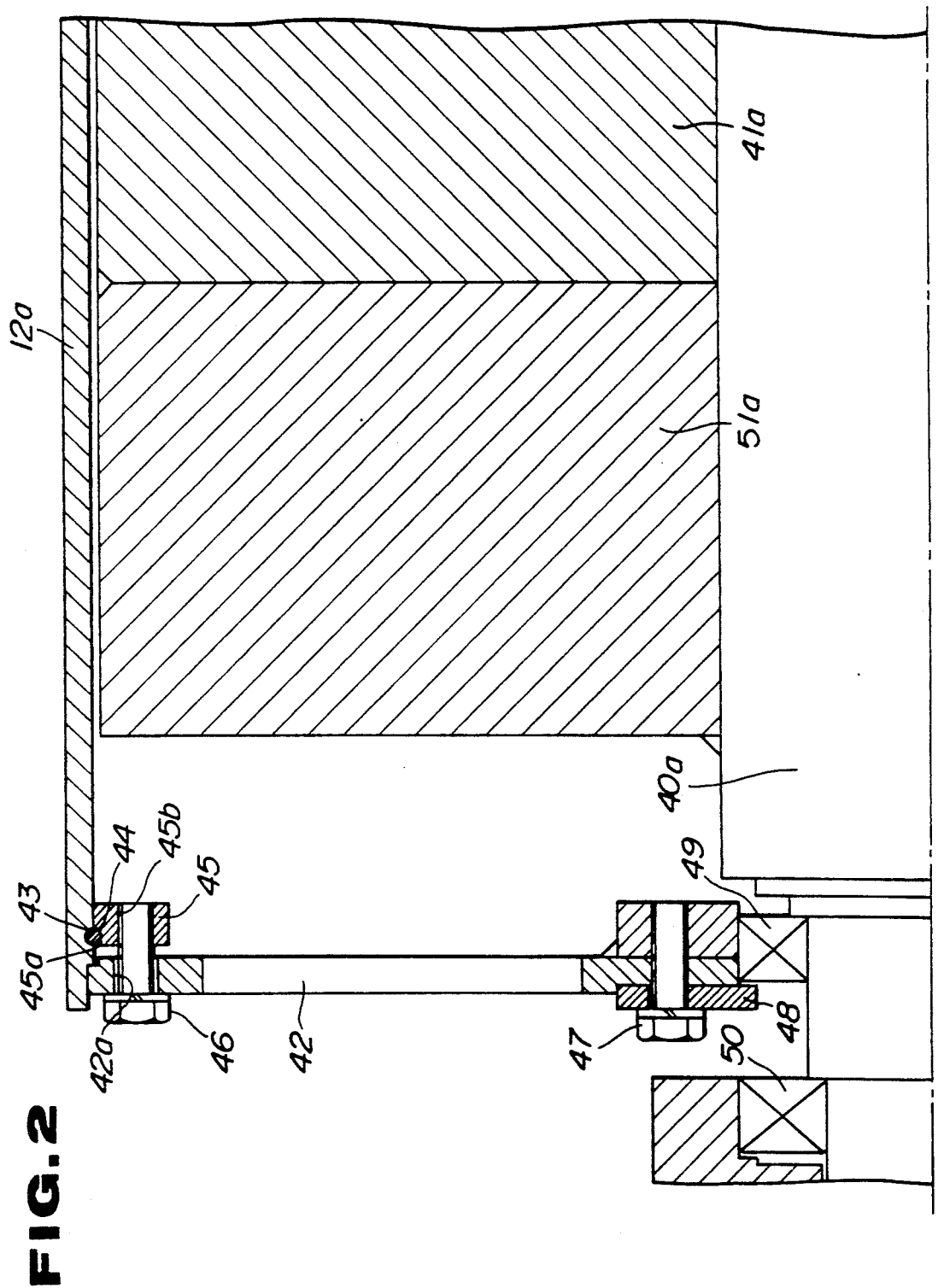
FIG. 2 is an enlarged cross-sectional view showing mounting structure of a free roller bracket and associated elements.

Flywheels 41a, 51a, 41b, 51b are respectively mounted on associated rotary shafts 40a and 40b through associated electromagnetic clutches for co-rotation therewith when the corresponding electromagnetic clutches are engaged. The rotary shaft 40a is connected to the rotary shaft 14 through the coupling 16 for co-rotation therewith and the rotary shaft 40b is connected to the rotary shaft 14 through the clutch 18 for co-rotation therewith when the clutch 18 is engaged. As shown in FIG. 2, for preventing the flywheels 41a and 41b from loosing away from the rotary shafts 40a and 40b, brackets 42 are provided. The brackets 42 are detachably mounted on respective axial ends of the free rollers 12a and 12b. In order to detachably mount the bracket 42, a circumferentially extending cross-sectionally semi-circular groove 43 is formed on the inner periphery of each of the free rollers 12a and 12b. A cross-sectionally circular stopper member 44 is detachably mounted in the groove 43 such that an approximately half of the stopper member 44 is projected from the inner periphery of each of the free rollers 12a and 12b. An annular stopper flange 45 is provided axially inside of the stopper member 44. The stopper flange 45 is formed with a cut-out 45a extending along the outer circumferential edge thereof so that the stopper flange 45 may engage with the stopper member 44 at the cut-out 45. The stopper flange 45 is further formed with one or more threaded bores 45b to engage with fastening bolts 46 each extending through an opening 42a formed through the bracket 42. On the other hand, a radially central portion of each bracket 42 is also secured on a bearing 49 mounted on the rotary shaft 40a or 40b, by means of a flange 48 and fastening bolts 47. Through the bearings 49 provided between the rotary shaft 40a and the free roller 12a and between the rotary shaft 40b and the free roller 12b, the free rollers 12a and 12b are rotatable relative to the corresponding rotary shafts 40a and 40b. The rotary shafts 40a and 40b are further supported by bearings 50 relative to the stationary side of the chassis dynamometer.

When installing each of the flywheels 41a and 41b and/or each of additional flywheels 51a and 51b within the interior space of the associated one of the free rollers 12a and 12b with the bracket 42 in a position as shown in FIG. 2, the fastening bolts 46 and 47 are first disengaged for removing the bracket 42. Thereafter, the stopper member 44 is removed form the groove 43 so that the stopper flange 45 can be removed away from the interior space of the free roller 12a or 12b. Then, the flywheels are inserted into the corresponding free roller 12a or 12b to be mounted onto the corresponding rotary shaft 40a or 40b. Then, the bracket 42 is reinstalled in a reversed manner.

Figure 3:
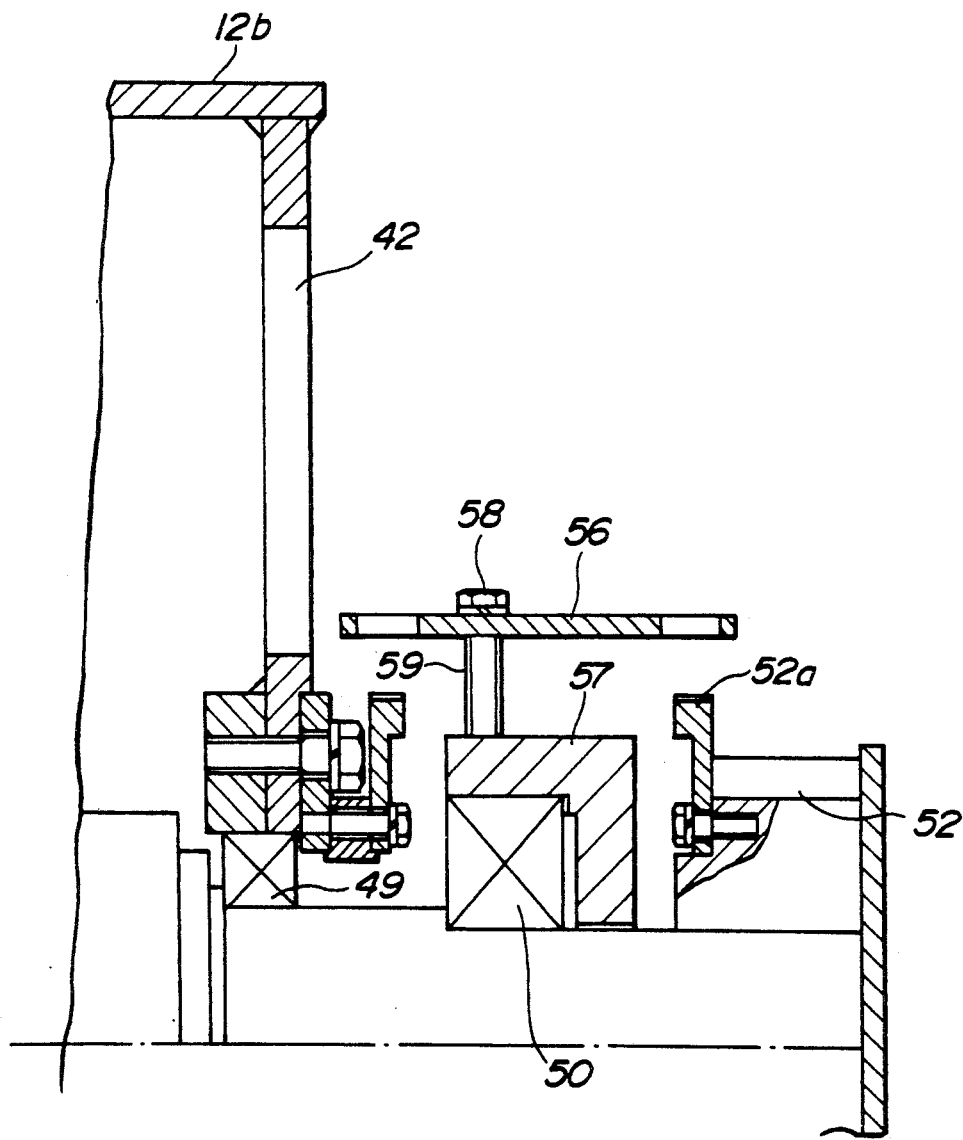
FIG. 3 is an enlarged cross-sectional view showing a timing pulley and associated structure.

As shown in FIGS. 1 and 3, a timing pulley 52 is provided at one end of the rotary shaft 40b remote from the free roller 12a. The timing pulley 52 co-rotates with the rotary shaft 40b. A corresponding timing pulley 54 is provided at one end of a rotary shaft 53 remote from the load roller 11a. The timing pulley 54 co-rotates with the rotary shaft 53 which, in turn, co-rotates with the load roller 11b. A timing belt 55 extends between the timing pulleys 52 and 54 to be mounted thereon so as to transmit the driving power from the timing pulley 54 to the timing pulley 52. In this embodiment, a ratio of diameter of the timing pulley 52 to that of the timing pulley 54 is set at 1:2, i.e. the diameter of the timing pulley 54 is set twice that of the timing pulley 52. As a result, the rotary shaft 40b is rotated twice as fast as the rotary shaft 53.

In FIG. 3, a pulse pick-up mounting member 56 is fixedly supported on a pedestal 57 through a spacer 59 and bolt 58. A pulse pick-up (not shown) is mounted on this pulse pick-up mounting member 56 for monitoring rotational speed of the timing pulley 52.

The first preferred embodiment as described above operates as follows:

It is assumed that at least one of the flywheels 41a, 41b, 51a, 51b is engaged with the corresponding rotary shaft 40a or 40b through the associated electromagnetic clutch (with the clutch 18 being engaged when the flywheel 41a and/or 51a is engaged with the rotary shaft 40a to apply the corresponding inertial load to the vehicular driving wheels). When the load rollers 11a and 11b are driven by the vehicular driving wheels to rotate the rotary shaft 53, the timing pulley 54 starts to rotate. This rotation of the timing pulley 54 is transmitted to the timing pulley 52 via the timing belt 55. Since the diameter of the timing pulley 54 is twice that of the timing pulley 52, the engaged flywheel rotates twice as fast as the timing pulley 54, i.e. the load rollers 11a and 11b. It is to be appreciated that the inertial load generated by the engaged flywheel is directly proportional to the second power of the speed ratio, when the engaged flywheel rotates twice as fast as the load rollers 11a and 11b, the weight of the engaged flywheel can be reduced to one-fourth (¼) in comparison with a case where the engaged flywheel rotates at the same speed with the load rollers 11a and 11b. Accordingly, the weights of the flywheels to be mounted in the free rollers 12a and 12b can be reduced.

It is to be appreciated that, in the foregoing preferred embodiment, though the twin roller type chassis dynamometer includes a pair of the load rollers 11a and 11b and a pair of the free rollers 12a and 12b, the twin roller type chassis dynamometer may include only one load roller and only one free roller. Further, a ratio of the diameter of the timing pulley 52 to that of the timing pulley 54 is not limited to 1:2, and an appropriate ratio may be set according to a required speed increment of the timing pulley 52.

Now, a second preferred embodiment of the twin roller type chassis dynamometer will be described hereinbelow with reference to FIGS. 4 and 5, wherein the same or like parts or elements are designated by the same reference numerals as in FIG. 1. In the second preferred embodiment, the connecting arrangement between the rotary shafts 40a, 40b and the stationary side of the chassis dynamometer using the bearings 50 as shown in FIG. 1 is modified. The other structure is the same as in FIG. 1.

Figure 4:
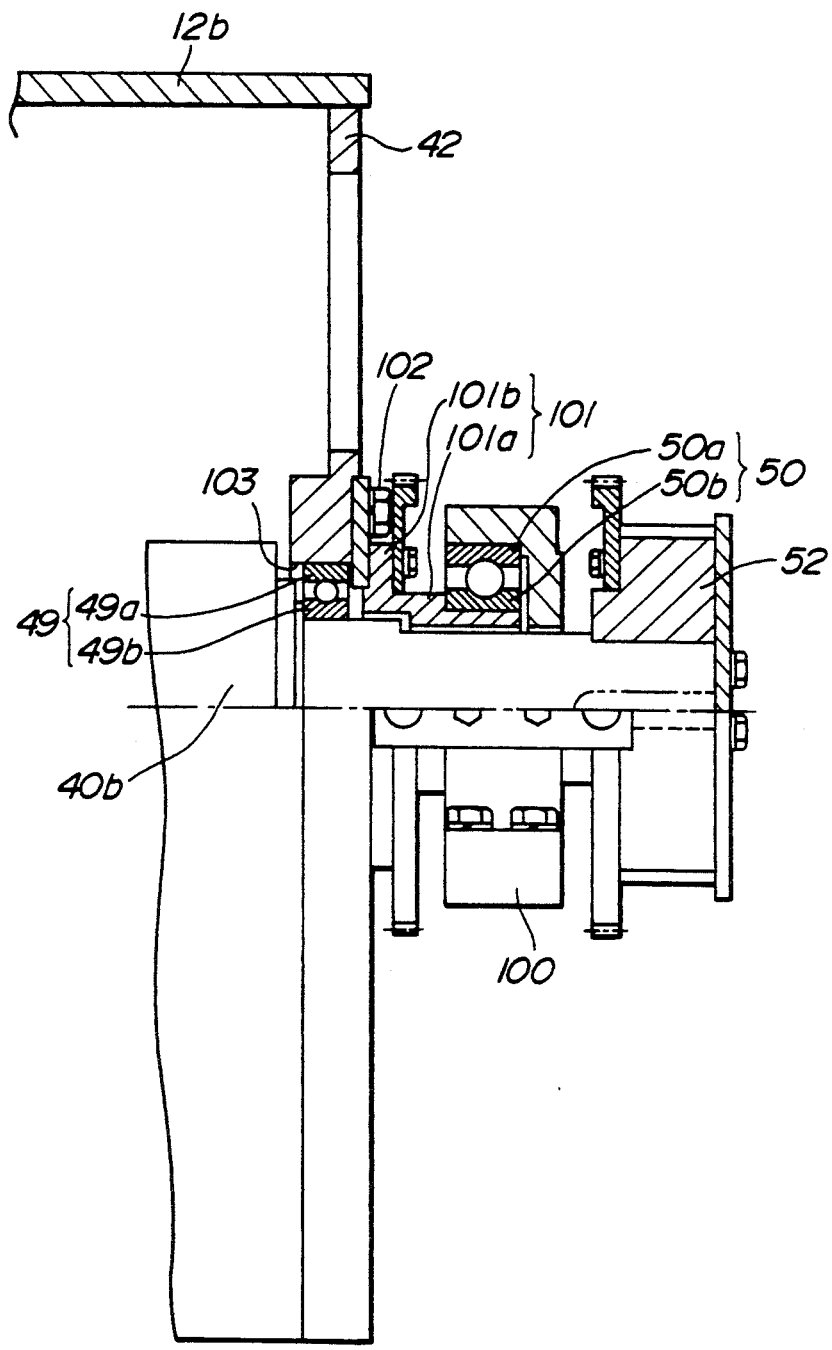
FIG. 4 is an enlarged cross-sectional view showing connecting arrangements between a flywheel rotary shaft and a free roller and between the free roller and a stationary side of the chassis dynamometer according to a second preferred embodiment of the present invention.
Figure 5:
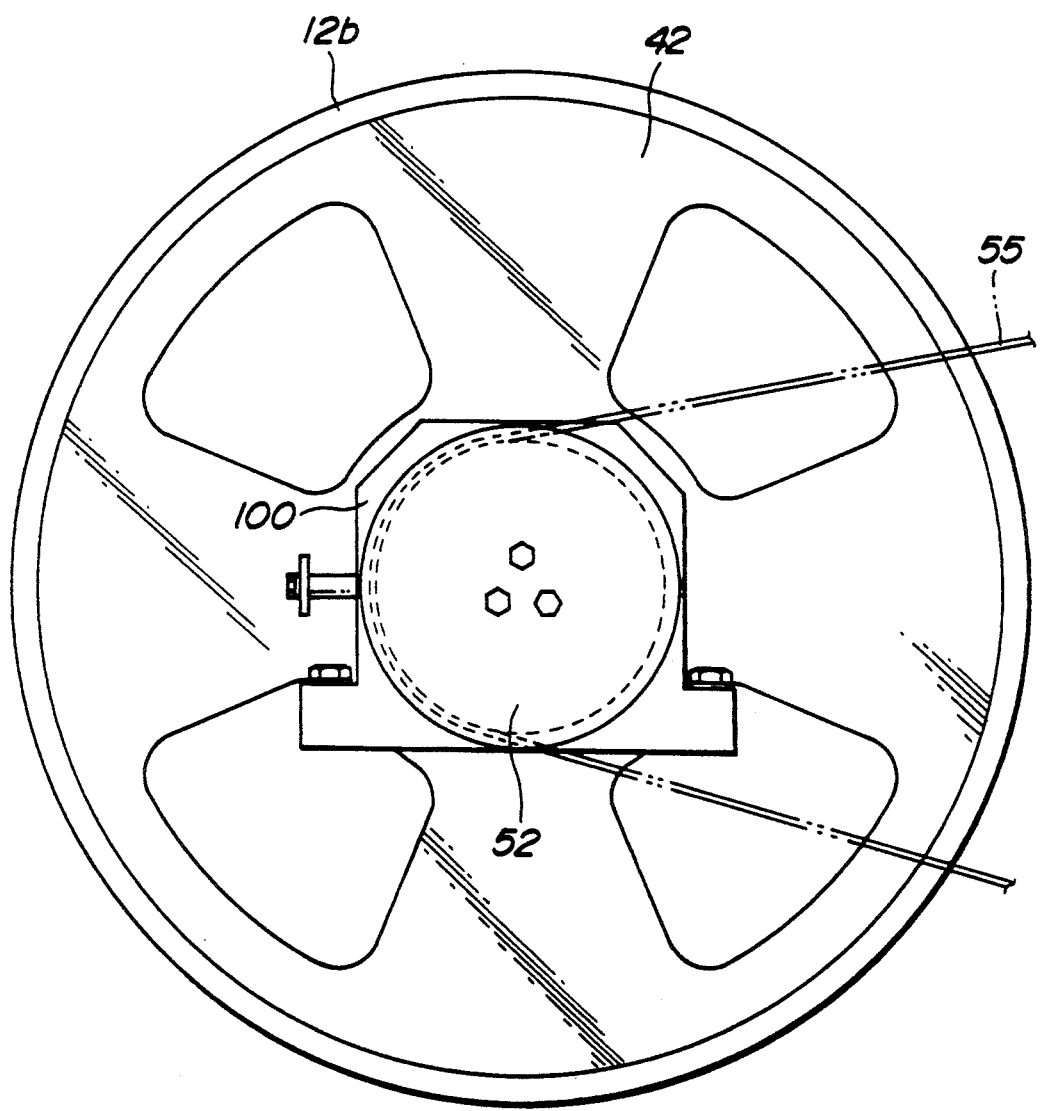
FIG. 5 is a schematic side view of FIG. 4.

In FIGS. 4 and 5, the bearing 50 is supported by a pedestal 100 in such a fashion that an outer ring 50a of the bearing 50 is fixedly fitted into the inner side of the pedestal 100. The bearing 50 is further supported by the free roller 12b through a flange sleeve 101 in such a fashion that an inner ring 50b of the bearing is fixedly fitted into the outer side of the flange sleeve 101. Specifically, the flange sleeve 101 has a cylindrical tubular section 101a where the bearing inner ring 50b is firmly mounted, and an annular flange section 101b which extends radially and is fixed to the bracket 42 through bolts 102 around a radially central opening 103 which is for receiving the rotary shaft 40b therethrough. As a result, the free roller 12b is supported to the pedestal 100 through the flange sleeve 101 and the bearing 50.

The bearing 49 is disposed in the central opening 103 between the rotary shaft 40b and the bracket 42 for allowing the rotary shaft 40b to rotate relative to the bracket 42, i.e. relative to the free roller 12b. The rotary shaft 40b extends through the tubular section 101a of the flange sleeve 101 in such a fashion that the rotary shaft 40b freely rotates relative to the flange sleeve 101. The timing pulley 52 is firmly mounted onto the rotary shaft 40b at its one end remote from the free roller 12a as in the first preferred embodiment of FIG. 1.

The second preferred embodiment as described above operates as follows:

The free roller 12b is driven by the vehicular driving wheel in a first direction at a relatively low speed, such as, at 2000 rmp. Accordingly, the bearing 50 supporting the free roller 12b through the flange sleeve 101 rotates at the same speed, i.e. at 2000 rmp.

On the other hand, the rotary shaft 40b is rotated in the same direction with the first direction twice as fast as the free roller 12b as described in the first preferred embodiment. Since the rotary shaft 40b is supported by the bearing 49, it is resulted that an outer ring of the bearing 49 rotates at 2000 rpm in the first direction, while, an inner ring of the bearing 49 rotates at 4000 rpm in the same direction with the first direction. Accordingly, the bearing 49 rotates at a speed of 2000 rpm which is a difference between the speed of the inner ring and that of the outer ring.

As a result, both the bearings 49 and 50 rotate at the relatively low speed of 2000 rpm, while, in the first preferred embodiment, the bearings 50 inevitably rotates at a higher speed of 4000 rpm.

It is to be appreciated that FIG. 4 shows only one pair of the bearings 49 and 50 for simplifying the explanation. As apparent, it is preferable that all of the connecting portions using the bearings 49 and 50 shown in FIG. 1 have the same connecting arrangement as shown in FIGS. 4 and 5.

The foregoing second preferred embodiment has the following advantages:

Since the bearings 50 rotate at the relatively low speed, a temperature increment of the bearings 50 is effectively prevented. Accordingly, grease can be used as lubricant, and no hydraulic lubricating system or circuit is required which is otherwise required for cooling the heated bearings 50. As a result, sealing structure may be simplified.

Since the bearings 50 rotate at the relatively low speed, a dN value (bearing inner diameter × rotational speed) of the bearing 50 can be reduced. Accordingly, a standard bearing can be used as the bearing 50 which is preferable in view of the cost. Further, a life of the bearing can be prolonged. Still further, vibration and noise created due to the high operating speed of the bearings 50 can be effectively avoided.

Now, a third preferred embodiment of the twin roller type chassis dynamometer will be described hereinbelow with reference to FIG. 6, wherein the same or like parts or elements are designated by the same reference numerals as in FIG. 1 to omit the explanation thereof for avoiding a redundant disclosure.

Figure 6:
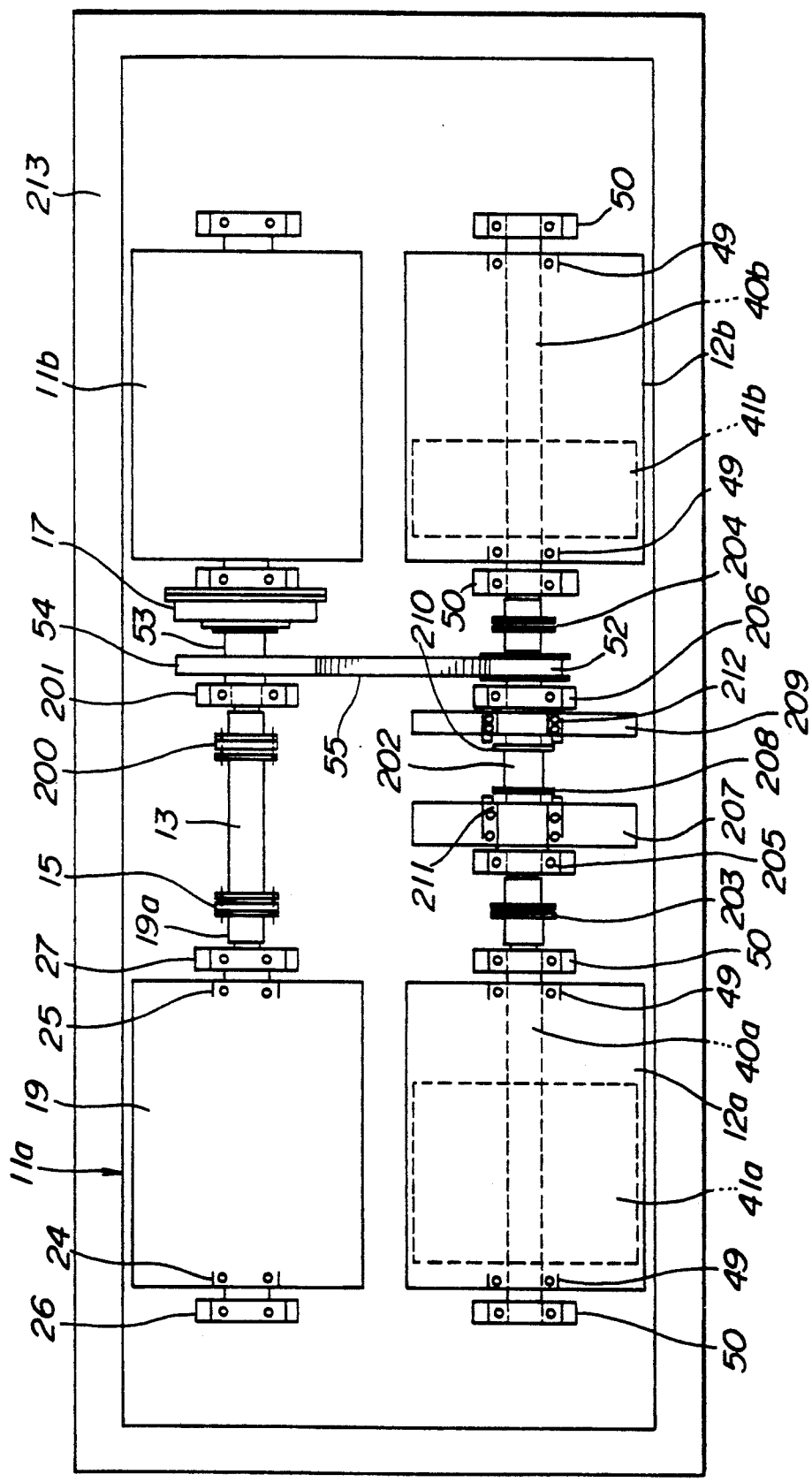
FIG. 6 is a schematic and diagrammatic plan view showing a twin roller type chassis dynamometer according to a third preferred embodiment of the present invention.

In FIG. 6, the load roller 11a has the rotary shaft 19a being co-rotatable with the roller body 19, and the load roller 11b has the rotary shaft 53 being co-rotatable with the load roller 11b. The rotary shafts 19a and 53 are connected to each other by the rotary shaft 13 through the coupling 15 and a coupling 200. The timing pulley 54 is firmly mounted onto the rotary shaft 53 for co-rotation therewith. The rotary shaft 53 is supported by a bearing 201 between the coupling 200 and the timing pulley 54.

The load roller 11a includes therein the dynamometer 20 as in the same manner with the first preferred embodiment of FIG. 1.

The rotary shaft 40a onto which the flywheel 41a is firmly mounted is connectable to a common rotary shaft 202 through a first electromagnetic clutch 203. Similarly, the rotary shaft 40b onto which the flywheel 41b is firmly mounted is connectable to the common rotary shaft 202 through a second electromagnetic clutch 204.

Onto the common rotary shaft 202, the timing pulley 52 is firmly mounted for co-rotation therewith. As in the first preferred embodiment, the timing pulley 52 has a smaller diameter than the timing pulley 54 for increasing the speed of the timing pulley 52 relative to that of the timing pulley 54. The timing belt 55 extends between the timing pulleys 52 and 54 for transmitting the driving power from the timing pulley 54 to the timing pulley 52.

The common rotary shaft 202 is supported near its axial ends by bearings 205 and 206 relative to the stationary side of the chassis dynamometer. A first adjusting flywheel 207 is mounted on the common shaft 202 through a bearing 211. The first adjusting flywheel 207 is fixed to the common shaft 202 for co-rotation therewith when a third electromagnetic clutch 208 is engaged, and is released from the common shaft 202 for free rotation when the third clutch 208 is disengaged. Further, a second adjusting flywheel 209 is mounted on the common shaft 202 through a bearing 212 in axially spaced apart relationship to the first adjusting flywheel 207. The second adjusting flywheel 209 is fixed to the common shaft 202 for co-rotation therewith when a fourth electromagnetic clutch 210 is engaged, and is released from the common shaft 202 for free rotation when the fourth clutch 210 is released. A reference numeral 213 denotes a frame structure for accommodating the chassis dynamometer.

In this third preferred embodiment, the flywheel 41a is set to have a weight of 1000 kg, the flywheel 41b a weight of 500 kg, the first adjusting flywheel a weight of 250 kg and the second adjusting flywheel a weight of 125 kg.

The third preferred embodiment as described above operates as follows:

In a normal performance test of the automotive vehicle, the first and second clutches 203 and 204 are engaged, while the third and fourth clutches 208 and 210 are released. Accordingly, the inertial load generated by the rotation of the flywheels 41a and 41b is applied to the vehicular driving wheels for simulating the actual inertial load generated by the weight of the automotive vehicle. When more inertial load is required, then the third clutch 208 and/or the fourth clutch 210 is engaged to produce the additional inertial load by the rotation of the first adjusting flywheel 207 and/or the second adjusting flywheel 209. Accordingly, in the third preferred embodiment, a fine control of the actual engine load simulated inertial load can be performed for satisfying a required simulation mode of the performance testing.

It is to be appreciated that since the total weight of the flywheels can be reduced by increasing the flywheel speed relative to the load and free rollers, the addition of the adjusting flywheels is made possible. Further, since the adjusting flywheels are co-axially provided between the free rollers 12a and 12b, no additional space for arranging the adjusting flywheels is required.

It is further to be appreciated that the first and second clutches 203 and 204 may be omitted and that the flywheels 41a and 41b may be connected to the associated rotary shafts 40a and 40b through the associated electromagnetic clutches as in the first preferred embodiment.

It is to be understood that this invention is not to be limited to the embodiments described above, and that various changes and modifications may be made without departing from the spirit and scope of the invention as defined in the appended claims.

What is claimed is:

1. A chassis dynamometer comprising:
   a first roller mounted on a first shaft for co-rotation therewith, said first roller drivingly connected to a dynamometer and being driven by a tested object;
   a second roller mounted on a second shaft, said second roller being rotatable relative to said second shaft and being driven by said tested object, said first and second shafts arranged in parallel to each other;
   a first flywheel mounted on said second shaft for co-rotating with said second shaft to form a simulated inertial load;
   power transmission means, associated with said first and second shafts, for transmitting a driving power from said first shaft to said second shaft such that said second shaft is rotated faster than said first shaft.

2. The chassis dynamometer as set forth in claim 1, wherein said first flywheel is disposed within said second roller.

3. The chassis dynamometer as set forth in claim 2, wherein a third roller is mounted onto said first shaft for co-rotation therewith in axially spaced apart relationship to said first roller and is driven by said tested object, and a fourth roller is mounted on said second shaft in axially spaced apart relationship to said second roller, said fourth roller being rotatable relative to said second shaft and being driven by said tested object, and wherein a second flywheel is mounted on said second shaft for co-rotation therewith to form and additional simulated inertial load, said second flywheel being disposed within said fourth roller.

4. The chassis dynamometer as set forth in claim 3, wherein said second shaft includes a clutch between said first and second flywheels for controlling the transmission of the driving power to said first flywheel from said power transmission means.

5. The chassis dynamometer as set forth in claim 4, wherein said power transmission means includes a first timing pulley mounted onto said first shaft for co-rotation therewith, a second timing pulley mounted onto said second shaft for co-rotation therewith and having a smaller diameter than said first timing pulley, and a timing belt extending between said first and second timing pulleys for transmitting the driving power from said first pulley to said second pulley in such a fashion that said second timing pulley rotates faster than said first timing pulley.

6. The chassis dynamometer as set forth in claim 5, wherein said first timing pulley is mounted onto said first shaft at one side of said third roller remote from said first roller, and said second timing pulley is mounted onto said second shaft at one side of said fourth roller remote from said second roller.

7. The chassis dynamometer as set forth in claim 3, wherein a third flywheel is mounted on said second shaft between said first and second flywheels, said third flywheel being connected to said second shaft for receiving said driving power when an associated clutch is engaged and being released from said second shaft for receiving no driving power from said power transmission means when said associated clutch is disengaged.

8. The chassis dynamometer as set forth in claim 3, wherein said second shaft includes a first section on which said first flywheel is mounted, a second section on which said second flywheel is mounted, and a third section on which third flywheel is mounted, said third flywheel being connected to said third section for co-rotation therewith when an associated first clutch is engaged and being connected from said third section for relative rotation thereto when said first clutch is disengaged, said third section disposed between said first and second sections such that said third section is connected to said first section for co-rotation therewith when an associated second clutch is engaged and disconnected from said first section when said second clutch is disengaged and such that said third section is connected to said second section for co-rotation therewith when an associated third clutch is engaged and disconnected from said second section when said third clutch is disengaged, and wherein said power transmission means is associated with said first and shaft and said third section of the second shaft for transmitting said driving power from said first shaft to said third section to allow said third section to rotate faster than said first shaft.

9. The chassis dynamometer as set forth in claim 8, wherein said power transmission means includes a first timing pulley mounted onto said first shaft between said first and third rollers for co-rotation with said first shaft, a second timing pulley mounted onto said third section of the second shaft for co-rotation therewith and having a smaller diameter than said first timing pulley, and a timing belt extending between said first and second timing pulleys for transmitting the driving power from said first pulley to said second pulley in such a fashion that said second timing pulley rotates faster than said first timing pulley.

10. The chassis dynamometer as set forth in claims 9, wherein a fourth flywheel is mounted on said third section of the second shaft in axially spaced apart relationship to said third flywheel such that said fourth flywheel is connected to said third section for co-rotation therewith when an associated fourth clutch is engaged and disconnected from said third section for relative rotation thereto when said fourth clutch is disengaged.

11. The chassis dynamometer as set forth in claim 1, wherein said power transmission means includes a first timing pulley mounting onto said first shaft for co-rotation therewith, a second timing pulley mounted onto said second shaft for co-rotation therewith and having a smaller diameter than said first timing pulley, and a timing belt extending between said first and second timing pulleys for transmitting the driving power from said first pulley to said second pulley in such fashion that said second timing pulley rotates faster than said first timing pulley.

12. The chassis dynamometer as set forth in claim 1, wherein first bearing means is provided between said second shaft and said second roller for allowing a relative rotation therebetween, and second bearing means is provided outside said second roller in axially spaced apart relationship to said first bearing means, said second bearing means disposed between an axial extension of said second roller and another part of the chassis dynamometer, said another part being stationary in motion, for allowing said second roller to rotate relative to said stationary part via said second bearing means.

13. The chassis dynamometer as set forth in claim 12, wherein said axial extension of the second roller has a cylindrical tubular shape which receives said second shaft therethrough to allow said second shaft to rotate relative to said axial extension.

14. The chassis dynamometer as set forth in claim 13, wherein said axial extension is fixed to said second roller through a radially extending member which is fixed to said second roller near said first bearing means.

15. The chassis dynamometer as set forth in claim 14, wherein said radially extending member has an annular shape and is fixed to said second roller around said first bearing means.

* * * * *